Nov. 18, 1952  H. W. DICKERSON  2,618,162
MULTIPLE GROOVE VARIABLE SPEED TRANSMISSION DEVICE
Filed March 1, 1949  2 SHEETS—SHEET 2
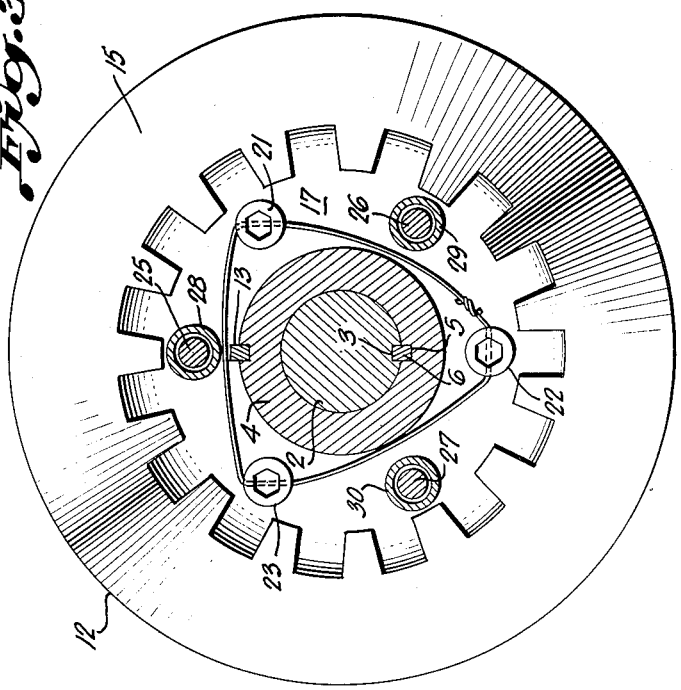
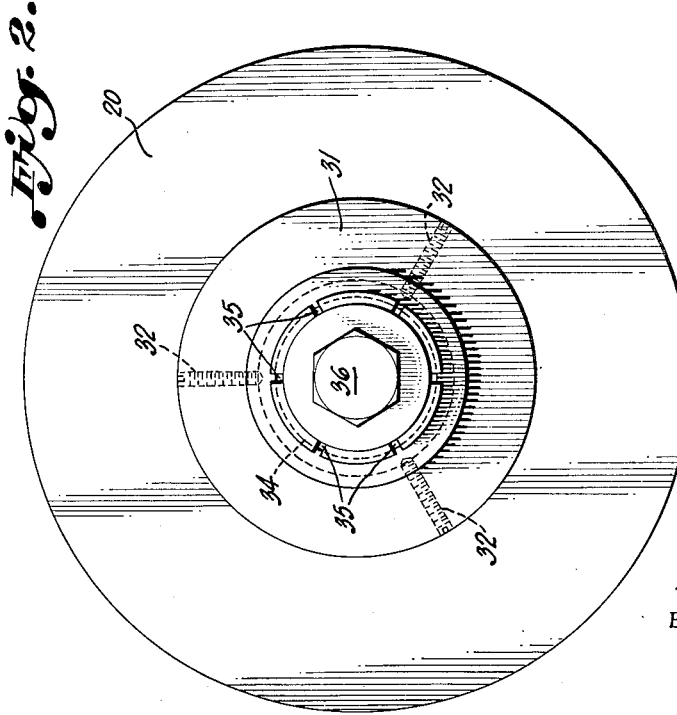
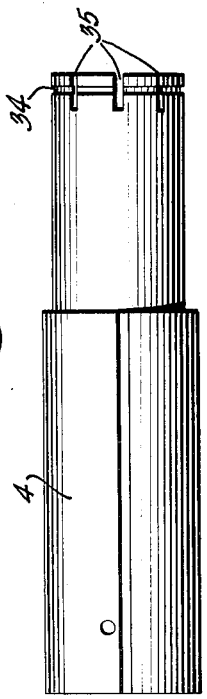
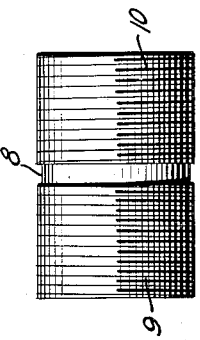
INVENTOR.
HENRY W. DICKERSON
BY
ATTORNEY Patented Nov. 18, 1952

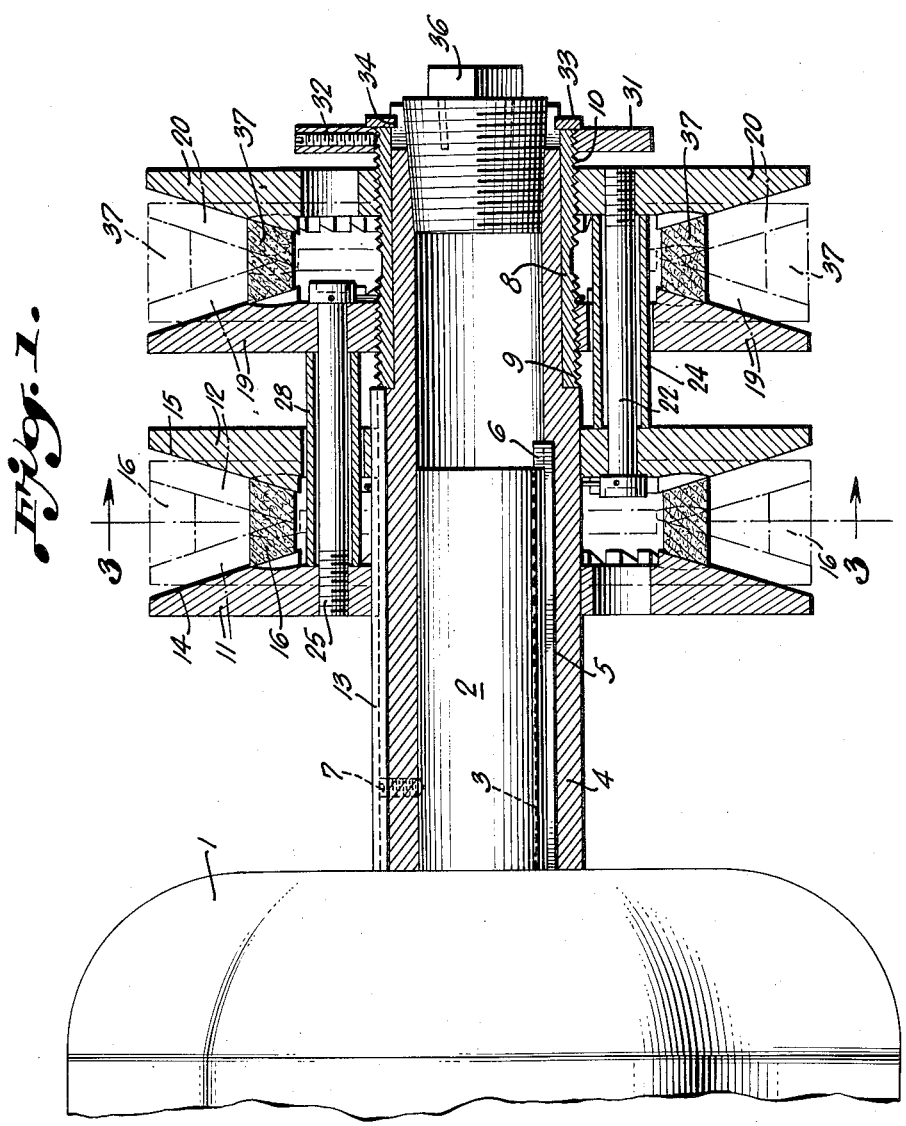

2,618,162

UNITED STATES PATENT OFFICE 2,618,162

MULTIPLE GROOVE VARIABLE SPEED TRANSMISSION DEVICE

Henry Wyatt Dickerson, Richmond, Va.

Application March 1, 1949, Serial No. 79,031

1 Claim. (Cl. 74—230.17)

This invention relates to a multiple groove variable speed transmission device.

One of the objects of this invention is the provision of a plurality of pulleys provided with co-acting companion flanges adapted to form a plurality of grooves for respectively housing trapezoidal or V-shaped belts.

Another object of this invention is the provision of a plurality of pulleys having companion flanges respectively forming a plurality of grooves in which are respectively disposed a plurality of V-shaped belts, and which companion flanges are adapted to elevate or lower said belts in unison and respectively in a plane perpendicular to the axis of rotation of said pulleys.

A further object of this invention is the provision of a plurality of adjustable grooved pulleys adapted to respectively accommodate a plurality of belts which are actuated by said pulleys or the latter driven by said belts; which belts are kept in alignment with said pulleys and a driver or driving companion pulley or the like.

A still further object of this invention is the provision of a multiple groove variable pitch V-belt sheave having a pitch change greater than twice the width of the belt used for the transmitting of power, and also the additional provision of a recessed undercut of the tongue and grooves to permit greater belt contact as well as broaden the range of pitch variation.

Other objects and features will more fully appear from the following description and accompanying drawings, in which:

Fig. 1 is a sectional view of the device;

Fig. 2 an end view;

Fig. 3 a sectional view taken along lines 3—3 of Fig. 1 in direction of arrows;

Fig. 4 an oppositely threaded collar; and

Fig. 5 a sleeve.

Referring to the drawings and for purposes of illustration only, a source of power is represented by an electric motor 1. It is to be understood this invention, as hereinbefore mentioned, may actuate a belt or be driven by one. The motor has extending therefrom the usual shaft 2 provided with a groove 3. A sleeve 4 has a slot 5 disposed therein and a key 6 is adapted to register with groove 3 and slot 5 to key the shaft and sleeve together for prevention of circumferential displacement with respect to each other. A set screw 7 is mounted in threadable fashion in the sleeve for engaging shaft 2 so as to prevent longitudinal movement of the sleeve on said shaft.

A substantial portion of the free or outer end of the sleeve is offset from its posterior portion and forms an axle upon which is mounted in rotatable fashion a collar 8 provided with left threads 9 and right threads 10.

Flanges 11—12 are mounted upon and keyed to sleeve 4, in slidable fashion, by a key 13 which prevents rotatable movement with respect to each other. The flanges have respectively inwardly inclined wall surfaces 14—15 which are adapted to coincide with the side surfaces of a belt 16. Each of said inclined surfaces are tongued and grooved so that the tongues of one flange register with the grooves of its companion flange and vice versa. Each flange is provided with recess 17 which permits a close mesh of said flanges with each other.

Flanges 19—20 are respectively mounted on left and right threads 9—10 of collar 8, and their construction is substantially similar to flanges 11—12 except they are mounted in threadable fashion on the collar, whereas flanges 11—12 are slidably mounted on the sleeve. Flanges 12—20 are secured together by three bolts 21—22—23 which flanges are held in spaced relation from each other by three struts, similar to strut 24 shown in Fig. 1. The said bolt shanks are respectively housed in the struts and each bolt shank housed in its companion strut respectively passes through companion apertures in flange 19; which flange is slidable on each of said struts as will more fully be explained hereinafter.

Flanges 11—19 are secured together in similar fashion as flanges 12—20 by three bolts 25—26—27 (see Fig. 3) which flanges are held in spaced relation by three struts 28—29—30 that respectively house the bolt shanks, said shanks and struts respectively pass through apertures in flange 12 and which flange is slidable over said struts.

Each of the bolt heads is provided with an orifice through which a wire passes to prevent the bolts becoming unthreaded from the flanges, as clearly shown in Fig. 3.

A circular hand grip 31 is mounted on collar 8 in threadable fashion and held against circumferential movement, on said collar, by lock screws 32. A snap ring 33 is disposed in a groove 34 on sleeve 4 (Fig. 5) and prevents longitudinal movement of said collar with respect to said shaft and said grip with respect to said ring.

The end of sleeve 4 is provided with a plurality of slots 35 and the inner end portion of the periphery is threaded in tapered fashion so as to accommodate a tapered threaded nut 36, so when the nut is screwed into the sleeve it spreads the latter thereby effecting locking means to the flanges through the collar.

A belt 37 is disposed in the groove formed by flanges 19—20 in similar fashion to belt 16.

The device functions as follows: When motor shaft 2 is actuated it drives sleeve 4 through means of key 6. The sleeve and flanges 11—12 being keyed together by key 13 causes the former to rotate and flange 11 actuates flange 19 by imparting power to the latter by bolts 25—26—27; while flange 12 likewise rotates flange 20 by bolts 21—22—23. As indicated in Fig. 1, the driver belts 16—37 are disposed near the base of the inclines of the flanges of their respective grooves which is at a low speed belt rate and if the speed of the belt is desired to be increased, nut 36 is removed from the sleeve and grip 31 rotated in clockwise fashion, which causes flange 20, on right hand threads 10, to move from grip 31 and at the same time flange 20 moves flange 12 in the same direction, by their companion bolts and struts. Also at the same time flange 19 on left hand threads 9 moves toward the grip and pulls flange 11 in the same direction by their companion bolts and struts.

It is thought obvious from the foregoing that the inclines on flanges 11—12 and 19—20 respectively move toward each other thereby forcing belts 16—37 upwardly as indicated in dotted line positions of Fig. 1, and thereby increase the speed of the belt. It will be noted that by slotting the basal portions of the inclines of the flanges to form the tongue and groove structure and providing a recess undercut in the flanges at the base of said tongues and grooves, a closer mesh of the companion flanges is obtained which permits greater pitch variation, and decreases longitudinal space requirement on the sleeve.

It will also be noticed that by the utilization of mechanical skill additional pulleys may be added to work in slidable fashion on the sleeve by connecting such unit in a similar manner to its adjacent slidable unit. Therefore the sheaves on the collar are used to vary the pitch diameter of its unit and by linking other units together on the sleeve, as hereinbefore described, their pitch diameter may be varied at the same time and in the same manner.

Having described this invention, what is claimed is:

In a device of the character described the combination consisting of a sleeve keyed and secured to a shaft; said sleeve being provided with a recess having its end portion grooved and slotted and its inner end surface tapered and threaded; a collar mounted in slidable fashion upon said recessed portion and provided with right and left hand threaded sections, a flange mounted in threadable fashion on said right threaded section; a companion flange mounted on said left threaded section; a flange keyed to and mounted in slidable fashion on said sleeve and held in fixed spaced relation to said first named flange by struts and bolts which pass through said second named flange; a flange keyed to and mounted in slidable fashion on said sleeve and being held in fixed spaced relation to said second named flange by struts and bolts which pass through its companion flange on said sleeve; said companion flanges on said collar and sleeve being respectively provided with inclined surfaces forming a groove for accommodating a belt, and also respectively provided with recesses so positioned as to form a tongue and groove meshing engagement; a hand grip mounted in threadable fashion on said collar and secured thereto by lock screws; a snap ring disposed in said grooved portion of the recess, and a lock nut registering with the inner threaded tapered portion.

HENRY WYATT DICKERSON.

REFERENCES CITED

The following references are of record in the file of this patent:

UNITED STATES PATENTS

| Number | Name | Date |
| --- | --- | --- |
| 2,172,230 | Watson | Sept. 5, 1939 |
| 2,198,471 | Benson | Apr. 23, 1940 |
| 2,262,678 | Heyer | Nov. 11, 1941 |
| 2,400,294 | Firth | May 14, 1946 |

FOREIGN PATENTS

| Number | Country | Date |
| --- | --- | --- |
| 472,411 | Great Britain | Sept. 23, 1937 |